US010679067B2

United States Patent
Li et al.

(10) Patent No.: US 10,679,067 B2
(45) Date of Patent: Jun. 9, 2020

(54) METHOD FOR DETECTING VIOLENT INCIDENT IN VIDEO BASED ON HYPERGRAPH TRANSITION

(71) Applicant: PEKING UNIVERSITY SHENZHEN GRADUATE SCHOOL, Shenzhen (CN)

(72) Inventors: Ge Li, Shenzhen (CN); Jingjia Huang, Shenzhen (CN); Nannan Li, Shenzhen (CN)

(73) Assignee: Peking University Shenzhen Graduate School, Shenzhen (CN)

(*) Notice: Subject to any disclaimer, the term of this patent is extended or adjusted under 35 U.S.C. 154(b) by 0 days.

(21) Appl. No.: 16/476,898

(22) PCT Filed: Mar. 28, 2018

(86) PCT No.: PCT/CN2018/080770
§ 371 (c)(1),
(2) Date: Jul. 10, 2019

(87) PCT Pub. No.: WO2019/019678
PCT Pub. Date: Jan. 31, 2019

(65) Prior Publication Data
US 2020/0117907 A1   Apr. 16, 2020

(30) Foreign Application Priority Data

Jul. 26, 2017  (CN) .......................... 2017 1 0618257

(51) Int. Cl.
*G06K 9/00* (2006.01)
*G06K 9/62* (2006.01)
(Continued)

(52) U.S. Cl.
CPC ....... *G06K 9/00744* (2013.01); *G06K 9/6215* (2013.01); *G06K 9/6297* (2013.01);
(Continued)

(58) Field of Classification Search
CPC ............. G06K 9/00744; G06K 9/6215; G06K 9/6297; G06K 2009/00738; G06T 7/246;
(Continued)

(56) References Cited

U.S. PATENT DOCUMENTS 8,520,975 B2 *  8/2013  Wang .................. G06T 7/20
                                                           345/626
9,430,840 B1 *  8/2016  Tian .................. G06K 9/00624
(Continued)

FOREIGN PATENT DOCUMENTS

CN   103279737 A   9/2013
CN   106339716 A   1/2017
(Continued)

OTHER PUBLICATIONS

Huang et al., Video Object Segmentation by Hypergraph Cut, Jun. 2009, IEEE Conference on Computer Vision and Pattern Recognition.*

(Continued)

*Primary Examiner* — John B Strege
(74) *Attorney, Agent, or Firm* — Burr & Forman LLP

(57) ABSTRACT

Provided is a method for detecting a violent incident in a video based on a hypergraph transition model, comprising a procedure of extracting a foreground target track, a procedure of establishing a hypergraph and a similarity measure, and a procedure of constructing a hypergraph transition descriptor; using the hypergraph to describe a spatial relationship of feature points, in order to reflect attitude information about a movement; and modelling the transition of correlative hypergraphs in a time sequence and extracting a feature descriptor HVC, wherein same can effectively reflect the intensity and stability of the movement. The method firstly analyses the spatial relationship of the feature points and a transition condition of a feature point group, and then (Continued)

performs conjoint analysis on same. The method of the present invention is sensitive to disorderly and irregular behaviours in a video, wherein same is applicable to the detection of violent incidents.

5 Claims, 3 Drawing Sheets

(51) Int. Cl.
G06T 7/215 (2017.01)
G06T 7/246 (2017.01)

(52) U.S. Cl.
CPC .............. *G06T 7/215* (2017.01); *G06T 7/246* (2017.01); *G06K 2009/00738* (2013.01); *G06T 2207/10016* (2013.01); *G06T 2207/30232* (2013.01); *G06T 2207/30241* (2013.01)

(58) Field of Classification Search
CPC ........... G06T 7/215; G06T 2207/30241; G06T 2207/30232; G06T 2207/10016
See application file for complete search history.

(56) References Cited

U.S. PATENT DOCUMENTS

| 9,787,640 | B1* | 10/2017 | Xie | H04L 63/0263 |
| 2012/0137367 | A1* | 5/2012 | Dupont | G06F 21/00 726/25 |
| 2012/0141000 | A1* | 6/2012 | Jeanne | G06K 9/00496 382/128 |
| 2013/0188869 | A1* | 7/2013 | Yoo | G06T 7/162 382/173 |
| 2013/0202210 | A1* | 8/2013 | Ryoo | G06K 9/00771 382/195 |
| 2014/0212002 | A1* | 7/2014 | Curcio | G06K 9/00744 382/107 |
| 2018/0336362 | A1* | 11/2018 | Guttmann | G06N 5/022 |

FOREIGN PATENT DOCUMENTS

| CN | 106529477 A | 3/2017 |
| CN | 107451553 A | 12/2017 |

OTHER PUBLICATIONS

International Search Report and Written Opinion of PCT/CN2018/080770, dated Jun. 20, 2018, all enclosed pages cited herein.

* cited by examiner

METHOD FOR DETECTING VIOLENT INCIDENT IN VIDEO BASED ON HYPERGRAPH TRANSITION

TECHNICAL FIELD

The present invention relates to video data processing technologies, and particularly to a method for detecting a violent incident in a video based on a hypergraph transition.

BACKGROUND ART

With the massive growth of the video data in the modern society, the video content understanding has become an important research topic, and the detection of violent incidents in the surveillance videos is of great significance to the maintenance of the public safety. The violent incidents in the video can be automatically screened and identified through a violent incident detection technology. On one hand, the violent incidents can be found in time; and on the other hand, effective offline screening can be carried out for the behaviors that may endanger the public safety in the video big data. However, the detection of the violent incidents in the video has high technical difficulties, including the following:

(I) the violent incidents are highly polymorphic, and it is difficult to extract the universal feature descriptions therefrom;

(II) too little positive sample data can be used for the model training;

(III) the resolution of the surveillance video is low.

Most of the existing mainstream methods for the recognition and detection of behaviors in a video take the deep learning as the core technology, and use the deep learning model to automatically extract and identify the features of the video content. However, due to the polymorphism of the violent incidents and the lack of available training data, the deep learning model which needs to be supported by massive data is difficult to work on this issue. Therefore, for the detection of the violent incidents, the methods based on local spatial-temporal feature descriptors are still popular. The main idea is to reflect the behavior features by modeling the relationship between the local feature descriptors (e.g., spatial-temporal interest points).

SUMMARY OF THE INVENTION

In order to overcome the deficiencies of the above prior arts, the present invention provides a method for detecting a violent incident in a video based on a hypergraph transition, which proposes a feature descriptor Histogram of Velocity Changing (HVC) (i.e., a hypergraph transition descriptor) for detecting the violent incident, so as to analyze a spatial relationship between feature points and a transition condition of a feature point group, respectively, and then perform a conjoint analysis thereof. The method of the present invention can effectively reflect the intensity and stability of the movement, is sensitive to disorderly and irregular behaviors, and is universal for the detection of the violent incidents at certain extent.

The principle of the present invention is to extract and track the Spatial Temporal Interest Points (STIPs) in the video, while detecting and segmenting the moving foreground in the video, classify the extracted interest points based on the foreground blocks to which they belong, filter the possible noise interest points using the foreground blocks, and estimate the movement trajectories of the foreground blocks according to the trajectories obtained by tracking the interest points; each of the foreground block trajectories corresponds to a group of movement sequences, and each of the movement sequences is analyzed using action attitude information in the foreground block and attitude change information in the trajectory. Specifically, the interest points in each of the foreground blocks are modeled using a hypergraph, and the action attitude information in the foreground block is constructed using the hypergraph, wherein a new feature descriptor, i.e., Histogram of Velocity Changing (HVC) is proposed in the present invention to describe the transition process of the hypergraph; and finally, the hypergraph and the HVC are combined into a chain (Hypergraph-Transition (H-T) Chain) according to the sequence of foreground block trajectories to describe the whole movement sequence. The H-T Chain can be modeled using a Hidden Markov Model (HMM) to obtain the HMM model of the violent behaviors.

The technical solutions provided by the present invention are as follows: a method for detecting a violent incident in a video based on a hypergraph transition, wherein the hypergraph transition comprises a procedure of constructing a hypergraph model and a hypergraph transition process; a hypergraph is used to describe a spatial relationship between feature points so as to reflect attitude information of a movement; a feature descriptor HVC for detecting a violent incident is proposed, so as to analyze the spatial relationship between the feature points and a transition condition of a feature point group, respectively, and then perform a conjoint analysis thereof, specifically comprising the steps of:

1) extracting and tracking spatial-temporal interest points (STIPs) in a video, while detecting and segmenting a movement foreground in the video;

2) classifying the extracted interest points based on foreground blocks to which they belong, filtering possible noise interest points using the foreground blocks, and estimating movement trajectories of the foreground blocks according to trajectories obtained by tracking the interest points.

Steps 1) and 2) constitute the procedure of extracting a foreground target trajectory; specifically, in a video, especially in a surveillance video with low pixels, the tracking of the interest points is simpler and more robust than the target tracking. The present invention estimates a trajectory of a foreground target from a trajectory of the interest points. A foreground block of a t-th frame is denoted as $S_t$ by Equation 1:

$$S_t = \{s_{t,i}\}(i=1\ldots n) \quad \text{(Equation 1)}$$

wherein n is the number of foreground blocks obtained by segmenting the t-th frame; $s_{t,i}$ is represented by Equation 2:

$$s_{t,i} = \{p_{t,j}\}(j=1\ldots m) \quad \text{(Equation 2)}$$

wherein $p_{t,j}$ is an j-th interest point in the foreground block; when a foreground block $s_{t,i1}$ and a foreground block $s_{t+1,i2}$ satisfy Equation 3, it is deemed that the two foreground blocks belong to a same sequence:

$$\psi(s_{t,i_1}, s_{t+1,i_2}) = \frac{\sum_{j_1,j_2} \phi(p_{t,j_1}, p_{t+1,j_2})}{m_1} \geq thd \quad \text{(Equation 3)}$$

wherein $m_1$ is the number of the interest points in $s_{t,i1}$, and thd is an adjustable probability threshold. When $p_{t+1,j2}$ is a point of $p_{t,j1}$ tracked in a next frame, $\phi(p_{t,j_1}, p_{t+1,j_2})$ is equal to 1, otherwise it is 0.

3) each of the foreground block trajectories corresponds to a group of movement sequences, and each of the movement sequences is analyzed using action attitude information in the foreground block and attitude change information in the trajectory, specifically comprising:

31) constructing a hypergraph and measuring a similarity: modeling the interest points in each of the foreground blocks using the hypergraph, and constructing action attitude information in the foreground block using the hypergraph;

specifically, for constructing a hypergraph and measuring a similarity in the present invention, a hypergraph is used to model movement attitudes contained in the foreground blocks, and the hypergraph has a good affine invariance. For a foreground block $s_i$, a hypergraph structure $G^i$ is defined as Equation 4:

$$G^i = (V^i, E^i, F^i) \quad \text{(Equation 4)}$$

wherein $V^i$ is a set of the interest points in the graph, $E^i$ is a hyperedge in the graph, and each edge is a triplet of three points; $F^i$ is a set of features corresponding to the points. For two hypergraphs (such as $G^1$ and $G^2$), a matching matrix A is defined to represent a matching relationship between them, as shown in Equation 5:

$$A = \{X \in \{0,1\}^{N_1 \times N_2}, \Sigma_i X_{i,j} = 1\} \quad \text{(Equation 5)}$$

wherein $N_1$ and $N_2$ are the numbers of points in the two hypergraphs, respectively. The similarity between attitudes contained in different blocks is expressed by a score value under best matching, and is calculated by Equation 6:

$$\text{score}(A) = \Sigma_{i,i',j,j',k,k'} H_{i,i',j,j',k,k'} X_{i,i'} X_{j,j'} X_{k,k'} \quad \text{(Equation 6)}$$

wherein $H_{i,i',j,j',k,k'}$ is a similarity measure function between hyperedges $E = \{i,j,k\}$ and $E' = \{i',j',k'\}$, and is expressed by Equation 7. The similarity increases as the score value rises.

$$H_{i,i',j,j',k,k'} = \exp\left\{-\frac{\|f_{E_{ijk}} - f_{E_{i'j'k'}}\|}{\sigma}\right\} \quad \text{(Equation 7)}$$

wherein $f_{E_{ijk}} = [a_{ijk}, F_i, F_j, F_k]$ is a feature vector, and $a_{ijk}$ defines a spatial relationship between three points, as shown in Equation 8:

$$a_{ijk} = [\sin(\vec{ij}, \vec{ik}), \sin(\vec{ji}, \vec{jk})] \quad \text{(Equation 8)}$$

wherein sin (·) is a trigonometric sine function, and $\vec{ij}$ is a vector pointing from point $p_i$ to $p_j$.

32) constructing a new feature descriptor—Histogram of Velocity Changing (HVC) to describe the transition process of the hypergraph; the HVC can effectively reflect the intensity and stability of the movement, is sensitive to disorderly and irregular behaviors, and is suitable for the detection of the violent incidents.

The construction of an HVC is as shown in FIG. 2, wherein $v_i$ is a light stream at an interest point $p_i$, and s is a step length between the light streams during calculation. An intensity of velocity change from point $p_i$ to point $p_{i+s}$ is defined as Equation 9:

$$I_{i,i+s} = \frac{\|v_i - v_{i+s}\|}{\|v_i\|} \quad \text{(Equation 9)}$$

At the same time, an average amplitude of velocities of respective points in a trajectory $\overrightarrow{p_i p_{i+s}}$ is calculated by Equation 10:

$$M_{i,i+s} = \frac{\sum_{t=i}^{i+s} \|v_t\|}{s+1} \quad \text{(Equation 10)}$$

Finally, the HVC descriptors from $G^k$ to $G^{k+1}$ are obtained based on all the trajectories $\overrightarrow{p_i p_{i+s}}$ .33) finally, combining the hypergraph and the HVC into a Hypergraph Transition (H-T) chain according to a sequence of foreground block trajectories to describe a whole movement sequence; modeling the H-T Chain to obtain a model of violent behaviors, thereby achieving a detection of the violent incident in the video.

A Hidden Markov Model (HMM) may be used to model the H-T Chain to obtain an HMM model of the violent behaviors.

As compared with the prior arts, the present invention has the following beneficial effects:

The method of the present invention models the relationship between local feature descriptors and provides a method for detecting a violent incident in a video based on a hypergraph transition. Being different from the existing methods, the present invention adopts the hypergraph to describe the spatial relationship between the feature points so as to reflect the attitude information of the movement. As compared with other graph models, the hypergraph has a good affine invariance and performs better in the multi-view scene of the surveillance video. At the same time, in order to further mine the movement information, the method of the present invention models the transition between the associated hypergraphs in the time series and proposes a new feature descriptor HVC therefor. The HVC can effectively reflect the intensity and stability of the movement, is sensitive to disorderly and irregular behaviors, and is suitable for the detection of the violent incidents. The method of the present invention has the following characteristics:

(I) it uses a hypergraph transition process for the first time to detect a violent incident in a video;

(II) it analyzes a spatial relationship between feature points and a transition condition of a feature point group, respectively, and then performs a conjoint analysis thereof;

(III) it proposes a feature descriptor HVC which can effectively reflect the intensity and stability of the movement, is sensitive to disorderly and irregular behaviors, and is suitable for the detection of the violent incidents.

The algorithm described by the present invention is tested on the UT-Interaction data set and the BEHAVE data set, and the results show that the detection effect of the algorithm is better than those of the current existing methods.

DETAILED DESCRIPTION OF THE INVENTION

The present invention will be further described through the embodiments with reference to the drawings, but the scope of the present invention is not limited in any way.

Figure 1:
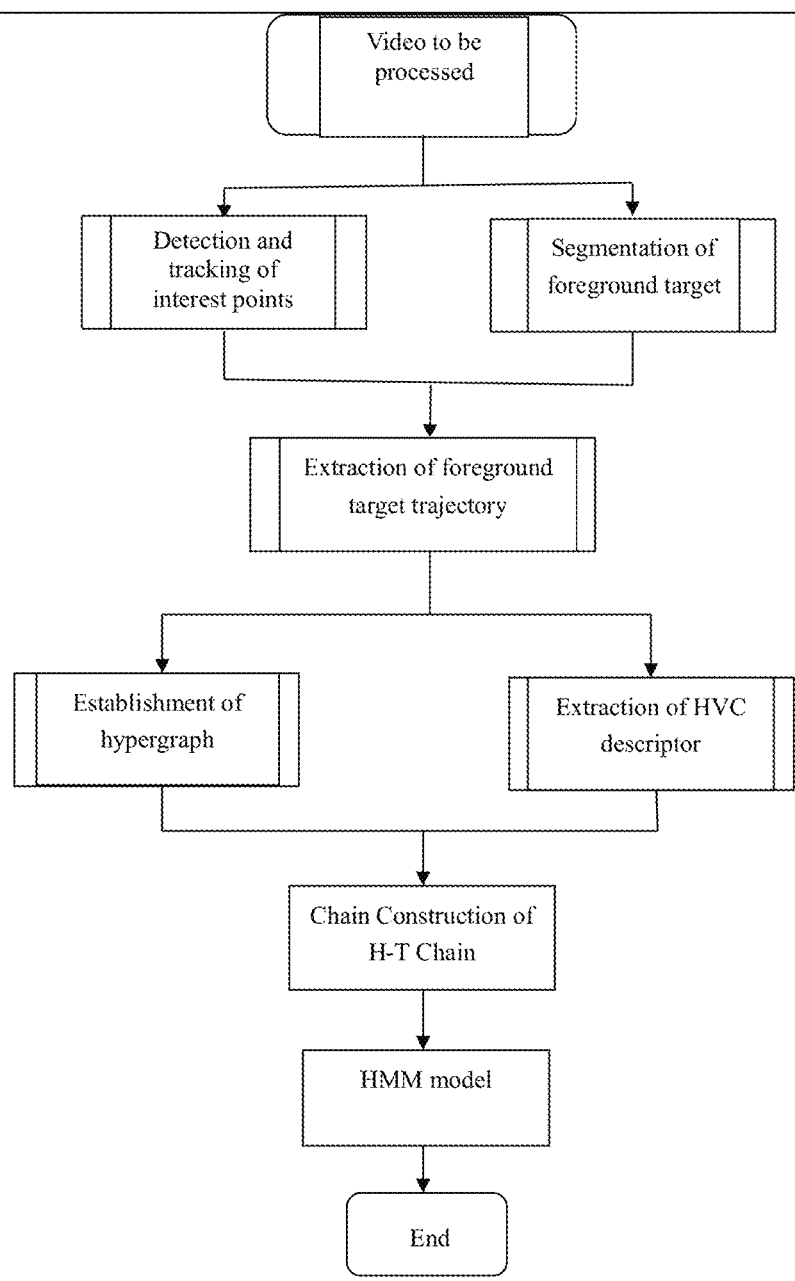
FIG. 1 is an overall flow block diagram of a method of the present invention.

The present invention provides a method for detecting a violent incident in a video based on a hypergraph transition, which starts to detect the violent incident from attitude information and an attitude transition process. Firstly, spatial-temporal interest points are extracted from a video clip and tracked. At the same time, a foreground segmentation algorithm or a foreground detection algorithm is used to segment a moving foreground object from a background, and the interest points are associated with a foreground block to which they belong. Next, a hypergraph is used to model the interest points in each of the foreground blocks, and a movement trajectory of a target corresponding to the foreground block is estimated according to a tracking result of the interest points. For each of the movement trajectories, the HVC is used to characterize the hypergraph transition. Finally, an H-T Chain model is established for each of the movement trajectories, and an HMM is used for violent detection. The overall flow block diagram of the method of the present invention is shown in FIG. 1. The core of the method for detecting a violent incident in a video based on a hypergraph transition of the present invention is to construct a hypergraph transition model. During specific implementation, the method comprises: extracting a foreground target trajectory, establishing a hypergraph and measuring a similarity, and constructing a hypergraph transition descriptor (HVC).

1) Extracting a foreground target trajectory:

In a video, especially in a surveillance video with low pixels, the tracking of the interest points is simpler and more robust than the target tracking. The present invention estimates a trajectory of a foreground target from a trajectory of the interest points. A foreground block of a t-th frame is denoted as $S_t$ by Equation 1:

$$S_t = \{s_{t,i}\}(i=1 \ldots n) \quad \text{(Equation 1)}$$

wherein n is the number of foreground blocks obtained by segmenting the t-th frame; $s_{t,i}$ is represented by Equation 2:

$$s_{t,i} = \{p_{t,j}\}(j=1 \ldots m) \quad \text{(Equation 2)}$$

wherein $p_{t,j}$ is an j-th interest point in the foreground block; when a foreground block $s_{t,i1}$ and a foreground block $s_{t+1,i2}$ satisfy Equation 3, it is deemed that the two foreground blocks belong to a same sequence:

$$\psi(s_{t,i_1}, s_{t+1,i_2}) = \frac{\sum_{j_1,j_2} \phi(p_{t,j_1}, p_{t+1,j_2})}{m_1} \geq thd \quad \text{(Equation 3)}$$

wherein $m_1$ is the number of the interest points in $s_{t,i1}$, and thd is an adjustable probability threshold. When $p_{t+1,j2}$ is a point of $p_{t,j1}$ tracked in a next frame, $\phi(p_{t,j_1}, p_{t+1,j_2})$ is equal to 1, otherwise it is 0.

2) Establishing a hypergraph and measuring a similarity:

In the present invention, the hypergraph is used to model the movement attitudes contained in the foreground blocks. For a foreground block $s_i$, a hypergraph structure $G^i$ is defined as Equation 4:

$$G^i = (V^i, E^i, F^i) \quad \text{(Equation 4)}$$

wherein $V^i$ is a set of the interest points in the graph, $E^i$ is a hyperedge in the graph, and each edge is a triplet of three points; $F^i$ is a set of features corresponding to the points. For two hypergraphs (such as $G^1$ and $G^2$), a matching matrix A is defined to represent a matching relationship between them, as shown in Equation 5:

$$A = \{X \in \{0,1\}^{N_1 \times N_2}, \Sigma_i X_{i,j} = 1\} \quad \text{(Equation 5)}$$

wherein $N_1$ and $N_2$ are the numbers of points in the two hypergraphs, respectively. The similarity between attitudes contained in different blocks is expressed by a score value under best matching, and is calculated by Equation 6:

$$\text{score}(A) = \Sigma_{i,i',j,j',k,k'} H_{i,i',j,j',k,k'} X_{i,i'} X_{j,j'} X_{k,k'} \quad \text{(Equation 6)}$$

wherein $H_{i,i',j,j',k,k'}$ is a similarity measure function between hyperedges $E=\{i,j,k\}$ and $E'=\{i',j',k'\}$, and is expressed by Equation 7. The similarity increases as the score value rises.

$$H_{i,i',j,j',k,k'} = \exp\left\{-\frac{\|f_{E_{ijk}} - f_{E_{i'j'k'}}\|}{\sigma}\right\} \quad \text{(Equation 7)}$$

wherein $f_{E_{ijk}} = [a_{ijk}, F_i, F_j, F_k]$ is a feature vector, and $a_{ijk}$ defines a spatial relationship between three points, as shown in Equation 8:

$$a_{ijk} = [\sin(\vec{ij}, \vec{ik}), \sin(\vec{ji}, \vec{jk})] \quad \text{(Equation 8)}$$

wherein sin (·) is a trigonometric sine function, and $\vec{ij}$ is a vector pointing from point $p_i$ to $p_j$.

Figure 2:
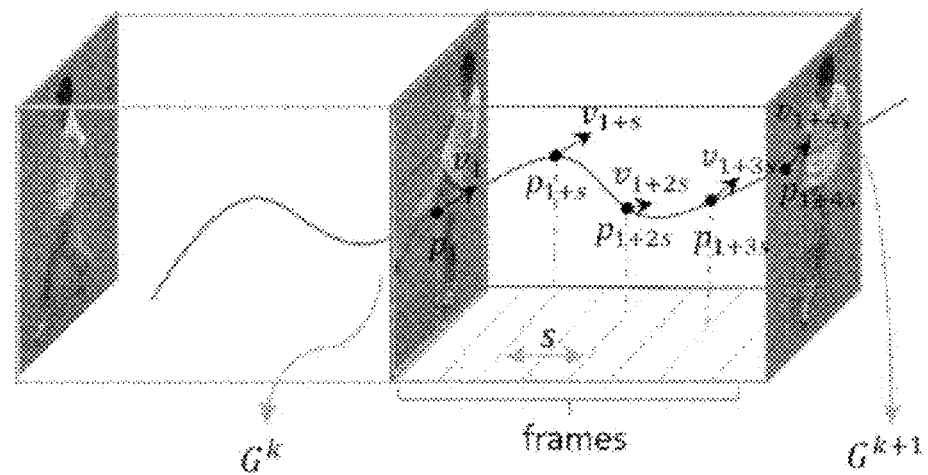
FIG. 2 is a schematic diagram of a construction of an HVC, wherein $v_i$ is a light stream at an interest point $p_i$, s is a step length between the light streams during calculation, Frames are video frames; $G^k$ and $G^{k+1}$ are hypergraphs numbered as k and k+1, respectively.

3) constructing a hypergraph transition descriptor—Histogram of Velocity Changing (HVC):

FIG. 2 is a schematic diagram of a construction of an HVC, wherein $v_i$ is a light stream at an interest point $p_i$, and s is a step length between the light streams during calculation. An intensity of velocity change from point $p_i$ to point $p_{i+s}$ is defined as Equation 9:

$$I_{i,i+s} = \frac{\|v_i - v_{i+s}\|}{\|v_i\|} \quad \text{(Equation 9)}$$

At the same time, an average amplitude of velocities of respective points in a trajectory $\overrightarrow{p_i p_{i+s}}$ is calculated by Equation 10:

$$M_{i,i+s} = \frac{\sum_{t=i}^{i+s} \|v_t\|}{s+1} \quad \text{(Equation 10)}$$

Figure 3:
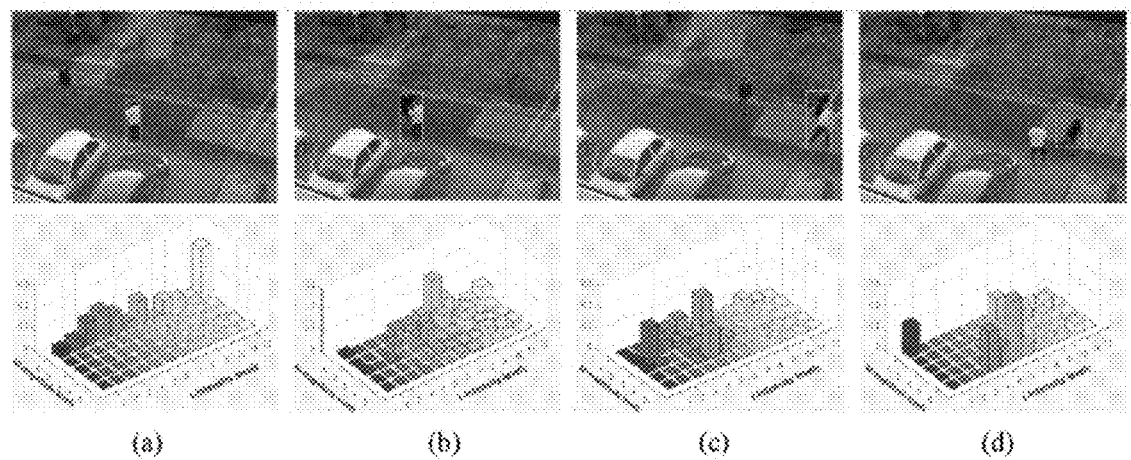
FIG. 3 shows visualization examples of HVC descriptors of different behaviors during specific implementation of the present invention, wherein (a) to (d) are corresponding to HVC descriptors of behaviors of fighting, running, walking together and wandering, respectively.

Finally, the HVC descriptors from $G^k$ to $G^{k+1}$ are obtained based on all the trajectories $\overrightarrow{p_i p_{i+s}}$. FIG. 3 shows visualization examples of HVC descriptors of different behaviors, wherein (a) to (d) are corresponding to of fighting, running, walking together and wandering, respectively.

Next, the BEHAVE data set is taken as an example to demonstrate how the algorithm of the present invention is used in practice.

Figure 4:
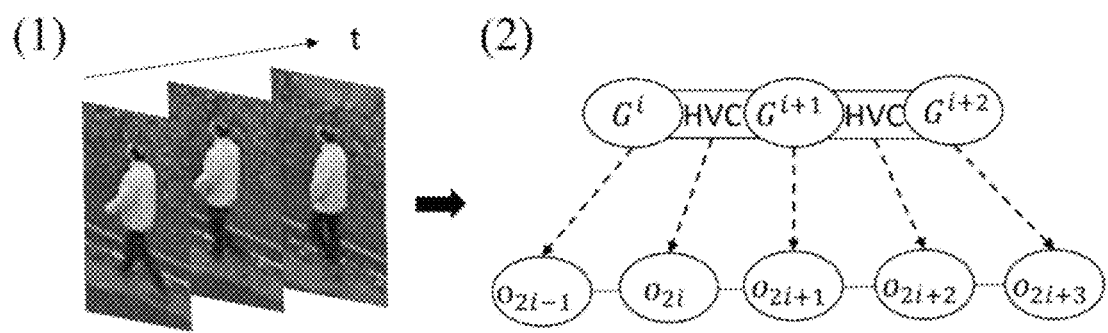
FIG. 4 is a schematic diagram of an implementation of a detection using a method of the present invention, wherein (1) is a movement trajectory obtained by tracking a video clip currently observed in a sliding window; in (2), an upper layer is a schematic diagram of an H-T Chain, where $G^i$ is an i-th hypergraph in a sequence; a lower layer is an observation sequence in an HMM model corresponding to the H-T Chain, and o is an observation value; and arrows between the upper and lower layers indicate corresponding relationships between respective parts of the H-T Chain and respective observation values in the HMM observation sequence.

BEHAVE is a video data set containing multi-person interactions under an outdoor surveillance scene, and it mainly includes behaviors such as gathering, parting, wandering, walking together, chasing, etc. A separate HMM model is trained for each of the action categories, and two-category processing is performed on the final recognition result. In the trajectory extraction phase, the thd value is set to 0.2; the hypergraphs are clustered by a spectral clustering algorithm, and the number of clustering centers is 25, thus constructing a dictionary. In the HVC calculation, the quantization levels are set as M=5 and I=12, and a dictionary containing 15 vocabularies is established. A window with a size of 80 frames is adopted and slid in the video in a step length of 20 frames. In each of the block trajectories, hypergraphs are constructed at an interval of 3 frames, and the HVC is calculated at an interval of 9 frames and a step length of 3 frames. Finally, the H-T Chain is taken as a feature description of the block trajectory, and sent to the HMM model for processing, so that all sequences in the video are analyzed. The detection implementation process is shown in FIG. 4, wherein (1) is a movement trajectory obtained by tracking a video clip currently observed in a sliding window; in (2), an upper layer is a schematic diagram of an H-T Chain, where $G^i$ is an i-th hypergraph in a sequence; a lower layer is an observation sequence in an HMM model corresponding to the H-T Chain, and o is an observation value; and arrows between the upper and lower layers indicate corresponding relationships between respective parts of the H-T Chain and respective observation values in the HMM observation sequence.

It should be noted that the disclosed embodiments are intended to help further understanding of the present invention, but those skilled in the art will appreciate that various substitutions and modifications are possible without departing from the spirit and scope of the present invention and the appended claims. Therefore, the present invention should not be limited to those disclosed in the embodiments, and the scope of protection claimed by the present invention should be subject to the scope defined by the claims.

The invention claimed is:

1. A method for detecting a violent incident in a video based on a hypergraph transition, comprising a procedure of extracting a foreground target trajectory, a procedure of establishing a hypergraph and measuring a similarity, and a procedure of constructing a hypergraph transition descriptor, wherein the procedure of extracting a foreground target trajectory comprises the steps of:

1) extracting and tracking spatial-temporal interest points (STIPs) in a video, while detecting and segmenting a movement foreground in the video;

2) classifying the extracted interest points based on foreground blocks to which they belong, filtering possible noise interest points using the foreground blocks, and estimating movement trajectories of the foreground blocks according to trajectories obtained by tracking the interest points;

in the procedure of establishing a hypergraph and measuring a similarity and the procedure of constructing a hypergraph transition descriptor, a corresponding relationship is established between each of the foreground block trajectories and a group of movement sequences; and each of the movement sequences is analyzed using movement attitude information in the foreground blocks and attitude transition information in the trajectory, comprising the steps of:

3) constructing a hypergraph and measuring a similarity: modeling the interest points in each of the foreground blocks using the hypergraph, and constructing action attitude information in the foreground block using the hypergraph;

for a foreground block $s_i$, a hypergraph structure $G^i$ is defined as Equation 4:

$$G^i = (V^i, E^i, F^i) \qquad \text{(Equation 4)}$$

wherein $V^i$ is a set of the interest points in the graph, $E^i$ is a hyperedge in the graph, and each edge is a triplet of three points; $F^i$ is a set of features corresponding to the points;

for two hypergraphs $G^1$ and $G^2$, a matching matrix A is defined to represent a matching relationship between them, as shown in Equation 5:

$$A = \{X \in \{0,1\}^{N_1 \times N_2}, \Sigma_j X_{i,j} = 1\} \qquad \text{(Equation 5)}$$

wherein $N_1$ and $N_2$ are the numbers of points in the two hypergraphs, respectively; a similarity between attitudes contained in different blocks is expressed by a score value under best matching, and is calculated by Equation 6:

$$\text{score } (A) = \Sigma_{i,i',j,j',k,k'} H_{i,i',j,j',k,k'} X_{i,i'} X_{j,j'} X_{k,k'} \qquad \text{(Equation 6)}$$

wherein $H_{i,i',j,j',k,k'}$ is a similarity measure function between hyperedges $E = \{i,j,k\}$ and $E' = \{i',j',k'\}$, and is expressed by Equation 7; the similarity increases as the score value rises;

$$H_{i,i',j,j',k,k'} = \exp\left\{-\frac{\|f_{E_{ijk}} - f_{E_{i'j'k'}}\|}{\sigma}\right\} \qquad \text{(Equation 7)}$$

wherein $f_{E_{ijk}} = [a_{ijk}, F_i, F_j, F_k]$ is a feature vector, and $a_{ijk}$ defines a spatial relationship between three points, as shown in Equation 8:

$$a_{ijk} = [\sin(\overrightarrow{ij}, \overrightarrow{ik}), \sin(\overrightarrow{ji}, \overrightarrow{jk})] \qquad \text{(Equation 8)}$$

wherein sin $(\cdot)$ is a trigonometric sine function, and $\overrightarrow{ij}$ is a vector pointing from point $p_i$ to $p_j$;

4) constructing a feature descriptor HVC to describe a hypergraph transition process: an intensity of velocity change from point $p_i$ to point $p_{i+s}$ is represented by Equation 9:

$$I_{i,i+s} = \frac{\|v_i - v_{i+s}\|}{\|v_i\|} \qquad \text{(Equation 9)}$$

at the same time, an average amplitude of velocities of respective points in a trajectory $\overrightarrow{p_i p_{i+s}}$ is calculated by Equation 10:

$$M_{i,i+s} = \frac{\sum_{t=i}^{i+s} \|v_t\|}{s+1}$$ (Equation 10)

the HVC descriptors from $G^k$ to $G^{k+1}$ are obtained based on all the trajectories $\overrightarrow{p_i p_{i+s}}$, 5) combining the hypergraph and the feature descriptor HVC into a Hypergraph Transition (H-T) chain according to a sequence of foreground block trajectories to describe a whole movement sequence; modeling the H-T Chain to obtain a model of violent behaviors, thereby achieving a detection of the violent incident in the video.

2. The method for detecting a violent incident in a video according to claim 1, wherein step 5) specifically uses a Hidden Markov Model (HMM) to model the H-T Chain to obtain an HMM model of the violent behaviors.

3. The method for detecting a violent incident in a video according to claim 1, wherein in the procedure of extracting a foreground target trajectory, the foreground target trajectory is estimated through a trajectory of the interest points; specifically, a foreground block of a t-th frame is denoted as $S_t$ by Equation 1:

$$S_t = \{s_{t,i}\}(i=1\ldots n)$$ (Equation 1)

wherein n is the number of foreground blocks obtained by segmenting the t-th frame; $s_{t,i}$ is represented by Equation 2:

$$s_{t,i} = \{p_{t,j}\}(j=1\ldots m)$$ (Equation 2)

wherein $p_{t,j}$ is an j-th interest point in the foreground block;

when a foreground block $s_{t,i1}$ and a foreground block $s_{t+1,i2}$ satisfy Equation 3, the two foreground blocks belong to a same sequence:

$$\psi(s_{t,i_1}, s_{t+1,i_2}) = \frac{\sum_{j_1,j_2} \phi(p_{t,j_1}, p_{t+1,j_2})}{m_1} \geq thd$$ (Equation 3)

wherein $m_1$ is the number of the interest points in $s_{t,i1}$, and thd is an adjustable probability threshold; when $p_{t+1,j2}$ is a point of $p_{t,j1}$ tracked in a next frame, $\phi(\overrightarrow{p_{t,j_1}}, \overrightarrow{p_{t+1,j_2}})$ is equal to 1, otherwise it is 0.

4. The method for detecting a violent incident in a video according to claim 3, wherein the thd value is set to 0.2.

5. The method for detecting a violent incident in a video according to claim 1, wherein the hypergraphs are clustered by a spectral clustering algorithm.

* * * * *